United States Patent Office  3,444,299  
Patented May 13, 1969

3,444,299  
METHODS FOR THE CONTROL AND PREVENTION OF HELMINTHS WITH PHENYLBENZOTHIAZOLIUM COMPOUNDS  
Irwin Boyden Wood, Hopewell, George Henri Rohrbacher, Jr., Princeton Junction, and Ronald Edward Bambury, Trenton, N.J., assignors to American Cyanamid Company, Stamford, Conn., a corporation of Maine  
No Drawing. Filed Feb. 7, 1964, Ser. No. 343,216  
Int. Cl. A61k 27/00  
U.S. Cl. 424—270    8 Claims

ABSTRACT OF THE DISCLOSURE

This invention is a method of administering known compounds for a new use. The compounds are of the class substituted phenylbenzothiazolium compounds. These compounds are useful in the control and treatment of helminthiases in warm-blooded animals.

---

The losses due to helminth infections in animals total millions of dollars annually. An effective anthelmintic composition at a comparatively low cost is highly desirable in the practice of animal husbandry.

We have now found that protection of warm blooded animals against damage caused by adult and larval stages of helminths can be obtained by the administration of new compositions of the present invention containing a small but effective amount of a compound having the formula:

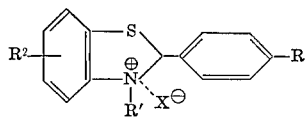

wherein R is selected from the group consisting of lower monoalkylamino, di-lower alkylamino, pyrrolidyl, piperidyl and morpholino; R' is lower alkyl; $R^2$ is selected from the group consisting of hydrogen and lower alkyl and $X^\ominus$ is a pharmaceutically acceptable anion.

Administration of the novel composition may be achieved either as a single oral dose in the form of a capsule, tablet, oblet or the like or as a drench in a liquid carrier, or it may be administered in small doses in the animal feed over an extended period or in a parenteral dose. It has been found that effective control of certain helminths in warm-blooded animals may be accomplished with a single oral dose of drug given at the rate of from about 5 to 60 mg./kg. of animal body weight. It has also been found that helminths may be most effectively controlled with small doses of drug given in the animal's feed at the rate of from about 1 to 20 or more mg./kg. of animal body weight per day which may amount to from about 5 to 1000 or more grams per ton of feed or a percentage of active ingredients to food ingested of from 0.001% to 0.10%.

Unlike the majority of anthelmintic agents which are effective only against the adult stages of helminths, the compounds of the instant invention have the decided advantage that they are effective against both the larval and adult stages. This unusual activity is particularly significant in the treatment of infected animals where damage to the vital organs, such as the liver and lungs, is directly attributable to the larvae, e.g., in the case of pigs infected with the larvae of *Ascaris suum*. Control of such larvae will greatly reduce economic losses caused by larvae due to mortality, suppressed weight gains, condemnation of livers and carcasses, and viral pneumonia whose effects are known to be markedly increased by tissue damage caused by ascarid larvae. Control of hookworm in dogs and other animals by elimination of the hookworm larvae and adult worms alike, prevents ill health of the animals and reduces the incidence of zoonoses, such as larva migrans. The compounds of the instant invention also have the advantage of being substantially non-staining in the process of elimination from the animal system. Furthermore, they have the further advantage that they may be used in relatively small doses which are highly effective and produce no untoward effects even when employed continuously over a prolonged period of time.

The compositions of the present invention can be presented for administration in unit dosage form as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc, stearic acid, magnesium stearate, dicalcium phosphate, gums and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term unit dosage form as used in the specification and claims refers to physically discrete units suitable as unitary dosages for warm blooded animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved and (b) the limitations inherent in the art of compounding such an active material for therapeutic use in warm blooded animals, as disclosed in detail in this specification, these being features of the present invention. Examples of suitable oral unit dosage forms in accord with this invention are tablets, capsules, pills, powder packets, granules, wafers, cachets, teaspoonfuls, dropperfuls, ampules, vials, segregated multiples of any of the foregoing, and other forms as herein described.

Other objects and advantages of the invention become apparent from the following examples which are provided hereinbelow.

EXAMPLE 1

To 5.0 grams of potassium p-dimethylaminobenzoate and 20 ml. of benzene is added dropwise with stirring at 0° C. a solution of 3.1 grams of oxalyl chloride in 6 ml. of benzene. The mixture is stirred for 20 minutes at room temperature and then under reflux for one hour. The potassium chloride precipitate is then removed by filtration of the reaction mixture. The filtrate is reduced in volume and cooled causing the desired p-dimethylaminobenzoyl chloride to crystallize. The p-dimethylaminobenzoyl chloride is collected by filtration. Yield 2.3 grams, melting point 147°–148° C.

EXAMPLE 2

To 7.0 grams of o-methylaminothiophenol [J. Chem. Soc. 123, 2369] in 20 ml. of benzene is added a slurry of 9.0 grams of p-dimethylaminobenzoyl chloride in 100 ml. of benzene. The mixture is heated under reflux with stirring for 30 minutes. The yellow solid which precipitates during the reaction period is collected by filtration and dried at 100° C. under reduced pressure. Recrystallization of the solid from an ethanol-ethylacetate mixture yields 12 grams of 3-methyl-2-(p-dimethylaminophenyl)-benzothiazolium chloride, melting point 188–190° C., dec.

EXAMPLE 3

When 12 grams of 5-methyl-2-methylaminothiophenol is treated with 14.4 grams of p-dimethylaminobenzoyl chloride, as described in Example 2, one obtains 23 grams of 3,6-dimethyl-2-(p-dimethylaminophenyl)-benzothiazolium chloride, melting point 211°–212° C., dec.

EXAMPLE 4

When p-pyrrolidinobenzoyl chloride (prepared from potassium p-pyrrolidinobenzoate and oxalyl chloride as described in Example 1) is treated with o-methylaminothiophenol, as described in Example 2, one obtains 3-methyl - 2 - (p-pyrrolidinophenyl)-benzothiazolium chloride.

EXAMPLE 5

By treating p-piperidinobenzoyl chloride (prepared by treating potassium p-piperidinobenzoate with oxalyl chloride as described in Example 1) with o-methylaminothiophenol, as described in Example 2, one obtains 3-methyl-2-(p-piperidinophenyl)-benzothiazolium chloride.

EXAMPLE 6

By treating p-morpholinobenzoyl chloride (prepared from potassium p-morpholinobenzoate with oxalyl chloride as described in Example 1) with o-methylaminothiophenol, one obtains 3 - methyl-2-(p-morpholinophenyl)-benzothiazolium chloride.

EXAMPLE 7

By treating N-methyl-p-acetamidobenzoyl chloride (prepared from potassium N-methyl-p-acetamidobenzoate and oxalyl chloride as described in Example 1) with o-methylaminothiophenol, one obtains 3 - methyl-2-(N-methyl-p-acetamidophenyl)-benzothiazolium chloride.

EXAMPLE 8

By treating 3-methyl-2-(N-methyl-p-acetamidophenyl)-benzothiazolium chloride with hydrochloric acid, one obtains 3-methyl-2-(p-methylaminophenyl)-benzothiazolium chloride.

EXAMPLE 9

When a water solution of 3-methyl-2-(p-dimethylaminophenyl)-benzothiazolium chloride is added to a water solution of potassium iodide, a precipitate of 3-methyl-2-(p-dimethylaminophenyl)-benzothiazolium iodide, melting point 223°–224° C. is obtained.

EXAMPLE 10

The benzothiazolium chlorides described in the above examples can be converted to less soluble salts (pamoates, stearates, iodides, perchlorates, etc.) by the process described in Example 9.

EXAMPLE 11

The benzothiazolium chlorides described in the preceding examples can be converted to other soluble salts (nitrates, acetates, sulfates, etc.) by well-known procedures employing ion-exchange resins.

EXAMPLE 12

Effects in swine

Data were obtained with pigs that had been experimentally inoculated with about 50,000 infective eggs of *Ascaris suum*. Treatment, in experimental groups, was given continuously in the total daily ration starting two days before inoculation. Concentrations of 13 to 250 grams of the drug per ton of feed were highly effective in preventing damage to liver and lungs and reducing the larvae in the small intestine. The untreated pigs showed severe pathologic condition of liver and lungs and a large number of larvae at necropsy. The control animals also developed verminous pneumonia, commonly called thumps, as a result of the migrating larvae. This high degree of ascarid larvacidal activity is an unusual effect that will greatly protect young pigs from the most harmful stage of swine ascarid infections.

TABLE 1.—THE EFFECTS OF THE COMPOUNDS OF THIS INVENTION AGAINST THE LARVAE OF *ASCARIS SUUM* IN PIGS

| Average daily dose Mg./kg., pig approx. gram/ton feed | Medication schedule (days) [1] | No. Pigs | Average Percent reduction of liver lesions [2] |
|---|---|---|---|
| 2-(p-dimethylaminophenyl)-3,6-dimethyl benzothiazolium chloride | | | |
| 15 | 250 | −2+4 | 1 | 99 |
| 10 | 168 | −2+13 | 2 | 96 |
| 7.8 | 130 | −2+4 | 3 | 100 |
| 5.7 | 95 | −2+13 | 4 | 100 |
| 4 | 67 | −2+4 | 2 | 99 |
| 2.9 | 47 | −2+14 | 2 | 88 |
| 2.1 | 33 | −2+4 | 5 | 90 |
| 1.2 | 21 | −2+4 | 2 | 99 |
| 0.8 | 13 | −2+4 | 2 | 66 |
| 2-(p-dimethylaminophenyl)-3-methyl benzothiazolium chloride | | | |
| 7.5 | 125 | −2+4 | 2 | 99 |
| 4.5 | 75 | −2+4 | 4 | 98 |
| 2.6 | 41 | −2+4 | 2 | 78 |
| 1 | 17 | −2+4 | 2 | 67 |

[1] −=Before.
  +=After inoculation with 50,000 larvated eggs of *Ascaris suum*.
[2] Controls averaged more than 1000 lesions.

EXAMPLE 13

Effects in dogs

In the following tests, mongrel puppies were experimentally inoculated with approximately 150–200 infected larvae of *Ancylostoma caninum*. The compounds were given orally, either by single oral doses in capsules or by repeated doses in the daily food ration. Treatments were given either about 30 days after inoculation, when the hookworms were adults and the egg laying capacity had reached a maximum and constant level, or starting one day after the inoculation of the infective larva of dog hookworm.

In the studies with adult hookworms, microscopic examinations of the feces of the infected dogs were made before and after each treatment to determine the number of hookworm eggs per gram of feces. A standard Stoll dilution technique was used to count the eggs. The effectiveness of the compound is indicated by the difference in the eggs per gram before and after medication. When a drug is ineffectual, little or no reduction in the eggs per gram occurs excepting normal daily variation, but an effective compound will greatly reduce and eliminate helminth eggs.

A hookworm egg reduction of 80% or more serves in these tests as the preliminary criterion of efficacy since such a reduction due to factors other than drug action occurs less than once in 140 observations (Thorson, R. and Pankavich, J., 1958; An Analysis of the Fluctuation of Hookworm Egg Counts of Puppies in a Screening Program. J. Parasitology 44 [4-Section 2]:40).

Dogs whose fecal egg count showed 80% or greater reduction were necropsied one day after the post-treatment egg count. The entire intestinal tract of the animal was examined for hookworm. The percent efficacy of the compound was calculated by comparing the number of hookworms with that present before treatment. The latter was estimated on the basis of extensive data indicating that 50 eggs per gram of feces equals about one adult worm in the host.

In the antilarval studies, the efficacy of the compound was determined by direct comparison with the number of hookworms in the treated dogs and their untreated infected controls.

In the antiascarid studies, the efficacy of a compound was determined by comparing the number of worms eliminated in the feces and the number remaining in the intestine of naturally infected dogs, at necropsy, after treatment.

TABLE 2.—THE EFFECT OF 2 - (p - DIMETHYLAMINOPHENYL)-3,6-DIMETHYL BENZOTHIAZOLIUM CHLORIDE AGAINST HELMINTHS IN DOGS

| Dose mg./kg. | No. of dogs | Percent reduction in number of worms after treatment | |
|---|---|---|---|
| | | Hookworm | Ascarids |
| Single oral doses against adult worms | | | |
| 50 | 1 | 100 | (1) |
| 25 | 1 | 100 | (1) |
| 7.5 | 2 | 88 | 70 |
| 5 | 3 | 62 | 86 |
| Repeated daily doses in feed against hookworm larvae | | | |
| 20 x 10 days | 2 | 100 | (1) |
| 10 x 10 days | 2 | 97 | (1) |

[1] No data.

EXAMPLE 14

Effects against *Nematospiroides dubius* in mice 2-(p-dimethylaminophenyl)-3,6-dimethyl benzothiazolium chloride was found to be 83% effective at a single oral dose of 50 mg./kg. against *N. dubius* in 4 mice experimentally infected with 50–100 infective larvae of this species; 25 mg./kg. was found to give moderate activity in mice. The effectiveness of this compound was determined by comparing the number of worms in treated and untreated control mice at necropsy.

We claim:
1. A method of eliminating and preventing helminthiases in warm-blooded animals by administering to said animals a composition comprising a carrier and a small but effective amount of a phenylbenzothiazolium compound having the formula:

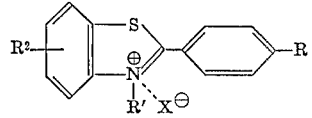

wherein R is a member selected from the group consisting of mono lower alkylamino, dilower alkylamino, pyrrolidyl, piperidyl and morpholino; R' is lower alkyl; R² is selected from the group consisting of hydrogen and lower alkyl and X⊖ is a pharmaceutically acceptable anion.

2. A method according to claim 1 wherein the phenylbenzothiazolium compound is 2 - (p - dimethylaminophenyl)-3,6-dimethyl benzothiazolium chloride.

3. A method according to claim 1 wherein the phenylbenzothiazolium compound is 2 - (p - dimethylaminophenyl)-3-methyl benzothiazolium chloride.

4. A method according to claim 1 wherein the phenylbenzothiazolium compound is 3-methyl-2-(p-dimethylaminophenyl)-benzothiazolium iodide.

5. A method of preventing and eliminating helminthiases in warm-blooded animals by administering to animals so exposed to helminths a composition comprising an animal feed ration and about between 5 and 1000 grams per ton of said feed of a compound of the formula:

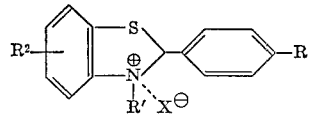

wherein R is selected from the group consisting of mono lower alkylamino, dilower alkylamino, pyrrollidyl, piperidyl and morpholino; R' is lower alkyl; R² is selected from the group consisting of hydrogen and lower alkyl and X⊖ is a pharmacologically acceptable anion.

6. A method of preventing and eliminating helminthiases in warm-blooded animals by administering to animals so exposed to helminths a composition comprising an animal feed and from about 5 to about 1000 grams of 2-(p-dimethylaminophenyl)-3,6-dimethyl benzothiazolium chloride per ton of said feed.

7. A method of preventing and eliminating helminthiases in warm-blooded animals by administering to animals so exposed to helminths a composition comprising an animal feed and from about 5 to about 1000 grams of 2-(p-dimethylaminophenyl)-3-methyl benzothiazolium chloride per ton of said feed.

8. A method of controlling helminths in an animal selected from the group consisting of dogs, pigs, and mice infected therewith which comprises orally administering to said infected animal a helminth controlling amount of 2-(p-dimethylaminophenyl)-3,6-dimethyl benzothiazolium chloride.

No references cited.

ALBERT T. MEYERS, *Primary Examiner.*

S. FRIEDMAN, *Assistant Examiner.*

U.S. Cl. X.R.
424—248, 267